(12) United States Patent
Wu et al.

(10) Patent No.: US 8,144,835 B2
(45) Date of Patent: Mar. 27, 2012

(54) DIGITAL SUBSCRIBER LINE (DSL) DIAGNOSTIC TOOLS AND METHODS TO USE THE SAME

(75) Inventors: Xidong Wu, Livermore, CA (US); Baofeng Jiang, Pleasanton, CA (US); Raghvendra Gurudath Savoor, Walnut Creek, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1224 days.

(21) Appl. No.: 11/857,883

(22) Filed: Sep. 19, 2007

(65) Prior Publication Data

US 2009/0074153 A1 Mar. 19, 2009

(51) Int. Cl.
*H04M 1/24* (2006.01)
*H04M 3/08* (2006.01)
*H04M 3/22* (2006.01)

(52) U.S. Cl. .................... 379/1.04; 379/9.04; 379/29.09

(58) Field of Classification Search .................. 379/1.03, 379/1.04, 9.03, 9.04, 28, 29.09; 370/252; 375/222, 224
See application file for complete search history.

(56) References Cited

U.S. PATENT DOCUMENTS

| | | | |
|---|---|---|---|
| 6,091,713 A | 7/2000 | Lechleider et al. | |
| 6,477,238 B1 | 11/2002 | Schneider et al. | |
| 6,507,870 B1 | 1/2003 | Yokell et al. | |
| 6,870,899 B2 | 3/2005 | Lu et al. | |
| 6,889,339 B1 | 5/2005 | D'Amico et al. | |
| 7,092,364 B1 | 8/2006 | Franklin et al. | |
| 7,149,285 B2 | 12/2006 | Kennedy et al. | |
| 7,212,496 B1 | 5/2007 | Chong | |
| 2005/0002383 A1 | 1/2005 | Lu et al. | |
| 2005/0081079 A1* | 4/2005 | Cheston et al. | 714/2 |
| 2005/0141492 A1 | 6/2005 | Chan | |
| 2005/0163286 A1 | 7/2005 | Jiang et al. | |
| 2006/0072708 A1 | 4/2006 | Warner et al. | |
| 2006/0072722 A1 | 4/2006 | Savoor et al. | |
| 2006/0109979 A1 | 5/2006 | Afzal et al. | |
| 2006/0159026 A1 | 7/2006 | Wu et al. | |
| 2006/0159106 A1 | 7/2006 | Slyke et al. | |
| 2006/0159232 A1 | 7/2006 | Jiang et al. | |
| 2007/0121793 A1 | 5/2007 | Wang et al. | |
| 2007/0208537 A1 | 9/2007 | Savoor et al. | |
| 2009/0168972 A1* | 7/2009 | Cioffi et al. | 379/1.04 |

OTHER PUBLICATIONS

U.S. Appl. No. 11/748,983, entitled "Methods and Apparatus to Qualify a Wire-Pair for a Digital Subscriber Line (DSL) Sservice", filed onf May 15, 2007, 37 pages.
U.S. Appl. No. 12/043,748, entitled "Methods and Apparatus to Detect Wideband Interference in Digital Subscriber Line (DSL) Systems", filed on Mar. 6, 2008, 28 pages.

(Continued)

*Primary Examiner* — Quoc D Tran
(74) *Attorney, Agent, or Firm* — Hanley, Flight & Zimmerman, LLC.

(57) ABSTRACT

Digital subscriber line (DSL) diagnostic tools and methods to use the same are disclosed. An example DSL diagnostic tool comprises a data collector to automatically collect real-time performance data associated with a subscriber, a database interface module to automatically collect historical data associated with the subscriber and to collect performance data associated with a neighbor subscriber line, a data analyzer to automatically analyze the real-time and historical performance data associated with the subscriber and the performance data associated with the neighbor subscriber line to identify a potential problem with an analyzed subscriber line associated with the subscriber, and a trouble ticket system interface module to automatically submit a repair ticket when the data analyzer does not identify a potential problem.

25 Claims, 9 Drawing Sheets

OTHER PUBLICATIONS

U.S. Appl. No. 11/542,292 entitled "Method and Apparatus to Develop Management Rules for Qualifying Broadband Services", filed an Oct. 3, 2006, 64 pages.

U.S. Appl. No. 11/751,353 entitled "Methods and Apparatus to Characterize a Digital Subscriber Line (DSL) Subscriber Loop", filed on May 30, 2007, 52 pages.

U.S. Appl. No. 12/006,299 entitled "System and Method for Evaluating and Troubleshooting a Digital Subscriber Line System", filed on Jan. 2, 2008, 14 pages.

U.S. Appl. No. 11/972,370 entitled "System and Method for Trouble Detection, Isolation, and Management", filed on Jan. 10, 2008, 30 pages.

U.S. Appl. No. 11/799,109 entitled "System and Method of Identifying a Location Associated With a Source of Data Communication..", filed on Apr. 30, 2007, 24 pages.

U.S. Appl. No. 11/708,646 entitled "Method and System for Testing a Communication Network", filed on Feb. 20, 2007, 24 pages.

* cited by examiner

FIG. 5A

| Line Error in 15-min intervals (Up to 48 hours) | 1 | 2 | 3 | 4 | 5 | 6 | 7 | 8 | 9 | 10 | 11 | 12 |
|---|---|---|---|---|---|---|---|---|---|---|---|---|
| TIME | 11:45 | 11:30 | 11:15 | 11:00 | 10:45 | 10:30 | 10:15 | 10:00 | 09:45 | 09:30 | 09:15 | 09:00 | 08:45 | 08:30 | 08:15 | 08:00 |
| DownStream CV | 0 | 0 | 0 | 0 | 0 | 0 | 0 | 0 | 0 | 0 | 0 | 0 | 0 | 0 | 0 | 0 |
| UPStream CV | 0 | 0 | 0 | 0 | 0 | 0 | 0 | 0 | 0 | 0 | 0 | 0 | 0 | 0 | 0 | 0 |
| DownStream ES | | | | | | | | | | | | | | | | |
| UPStream ES | 0 | 0 | 0 | 0 | 0 | 0 | 0 | 0 | 0 | 0 | 0 | 0 | 0 | 0 | 0 | 0 |
| DownStream SES | 0 | 0 | 0 | 0 | 0 | 0 | 0 | 0 | 0 | 0 | 0 | 0 | 0 | 0 | 0 | 0 |
| UPStream SES | 0 | 0 | 0 | 0 | 0 | 0 | 0 | 0 | 0 | 0 | 0 | 0 | 0 | 0 | 0 | 0 |
| DownStream FEC | | | | | | | | | | | | | | | | |
| UPStream FEC | 0 | 0 | 0 | 0 | 0 | 0 | 0 | 0 | 0 | 0 | 0 | 0 | 0 | 0 | 0 | 0 |
| DownStream LOL | 0 | 0 | 0 | 0 | 0 | 0 | 0 | 0 | 0 | 0 | 0 | 0 | 0 | 0 | 0 | 0 |
| DownStream LPR | 0 | 0 | 0 | 0 | 0 | 0 | 0 | 0 | 0 | 0 | 0 | 0 | 0 | 0 | 0 | 0 |
| DownStream LOS | 0 | 0 | 0 | 0 | 0 | 0 | 0 | 0 | 0 | 0 | 0 | 0 | 0 | 0 | 0 | 0 |
| UPStream LOS | 0 | 0 | 0 | 0 | 0 | 0 | 0 | 0 | 0 | 0 | 0 | 0 | 0 | 0 | 0 | 0 |
| DownStream LOF | 0 | 0 | 0 | 0 | 0 | 0 | 0 | 0 | 0 | 0 | 0 | 0 | 0 | 0 | 0 | 0 |
| UPStream LOF | 0 | 0 | 0 | 0 | 0 | 0 | 0 | 0 | 0 | 0 | 0 | 0 | 0 | 0 | 0 | 0 |
| Modem REINIT | 0 | 0 | 0 | 0 | 0 | 0 | 0 | 0 | 0 | 0 | 0 | 0 | 0 | 0 | 0 | 0 |
| Modem FAILINIT | 0 | 0 | 0 | 0 | 0 | 0 | 0 | 0 | 0 | 0 | 0 | 0 | 0 | 0 | 0 | 0 |
| DownStream UAS | 0 | 0 | 0 | 0 | 0 | 0 | 0 | 0 | 0 | 0 | 0 | 0 | 0 | 0 | 0 | 0 |
| UPStream UAS | 0 | 0 | 0 | 0 | 0 | 0 | 0 | 0 | 0 | 0 | 0 | 0 | 0 | 0 | 0 | 0 |
| DownStream LOE(%) | | | | | | | | | | | | | | | | |
| UPStream LOE(%) | 0 | 0 | 0 | 0 | 0 | 0 | 0 | 0 | 0 | 0 | 0 | 0 | 0 | 0 | 0 | 0 |

FIG. 5B

ADSL lines in the same neighborhood as 661-269-8445

Home    NB Search Home    Download

| TN | Street Address | City | State | Zipcode | ADSL Line Analysis Tools | Line Performance | Sync Status | Downstream Current Bitrate (kb/s) | Downstream Maximum Attainable Bitrate (kb/s) | Estimated Loop Length (kf) | Downstream Relative Capacity (%) | CO/RT |
|---|---|---|---|---|---|---|---|---|---|---|---|---|
| 661-269-2392 | 34223 N RED ROVER MINE RD | ACT | CA | 93510 | LPA | ShowRF | Good | IS-NR | 1536 | 4704 | 14.3 | 39 | CO |
| 661-269-4235 | 34232 N RED ROVER MINE RD | ACT | CA | 93510 | LPA | ShowRF | Marginal | IS-NR | 1984 | 3552 | 8.9 | 61 | CO |
| 661-269-2230 | 34249 N RED ROVER MINE RD | ACT | CA | 93510 | LPA | ShowRF | Marginal | IS-NR | 1536 | 2304 | 7.3 | 69 | CO |
| 661-269-8445 | 34311 N RED ROVER MINE RD | ACT | CA | 93510 | LPA | ShowRF | Good | IS-NR | 1536 | 7072 | 9.6 | 25 | CO |
| 661-269-1270 | 34340 N RED ROVER MINE RD | ACT | CA | 93510 | LPA | ShowRF | Marginal | IS-NR | 1536 | 992 | 19.9 | 100 | CO |
| 661-269-2086 | 34344 N RED ROVER MINE RD | ACT | CA | 93510 | LPA | ShowRF | Marginal | IS-NR | 1536 | 5568 | 11.6 | 31 | CO |
| 661-269-5670 | 34361 N RED ROVER MINE RD | ACT | CA | 93510 | LPA | ShowRF | Good | IS-NR | 1536 | 8096 | 14.6 | 22 | CO |
| 661-269-1091 | 34404 N RED ROVER MINE RD | ACT | CA | 93510 | LPA | ShowRF | Good | IS-NR | 1536 | 7827 | 8.9 | 24 | CO |

Unknown: Line status is OOS (Out of Service), such as customer end modem off. No enough valid parameters to determine line performance.
Good: Line status is IS-NR (In Service). There are less than 5 intervals of CVs (Code Violations) of 30 or less.
Marginal: Line status is IS-NR (In Service). Neither Error nor Good.
Error: Line status is IS-NR (In Service). There are 30 or more intervals of CVs (Code violations) of 500 or more.
note There are 33 intervals of downstream code violations in total for each line. Each interval is a 15 minute period.

FIG. 6

DIGITAL SUBSCRIBER LINE (DSL) DIAGNOSTIC TOOLS AND METHODS TO USE THE SAME

FIELD OF THE DISCLOSURE

This disclosure relates generally to digital subscriber line (DSL) services and/or systems and, more particularly, to DSL diagnostic tools and methods to use the same.

BACKGROUND

Communication systems using digital subscriber line (DSL) technologies are commonly utilized to provide Internet related services to subscribers, such as, for example, homes and/or businesses (also referred to herein as users, customers and/or customer-premises). DSL technologies enable customers to utilize telephone lines (e.g., ordinary twisted-pair copper telephone lines used to provide Plain Old Telephone System (POTS) services) to connect the customer to, for example, a high data-rate broadband Internet network, broadband service and/or broadband content. For example, a communication company and/or service provider may utilize a plurality of modems (e.g., a plurality of DSL modems) implemented by a DSL Access Multiplexer (DSLAM) at a central office (CO) to provide DSL communication services to a plurality of modems located at respective customer-premises. In general, a CO DSL modem receives broadband service content from, for example, a backbone server and forms a digital downstream DSL signal to be transmitted to a customer-premises DSL modem. Likewise, the central office DSL modem receives an upstream DSL signal from the customer-premises DSL modem and provides the data transported in the upstream DSL signal to the backbone server.

BRIEF DESCRIPTION OF THE DRAWINGS

FIGS. 4, 5A, 5B, 6 and 7 illustrate example user interfaces that may be used to implement the example web-based user interface module and/or, more generally, any or all of the example DSL diagnostic tools of FIGS. 1 and/or 2.

DETAILED DESCRIPTION

Figure 1:
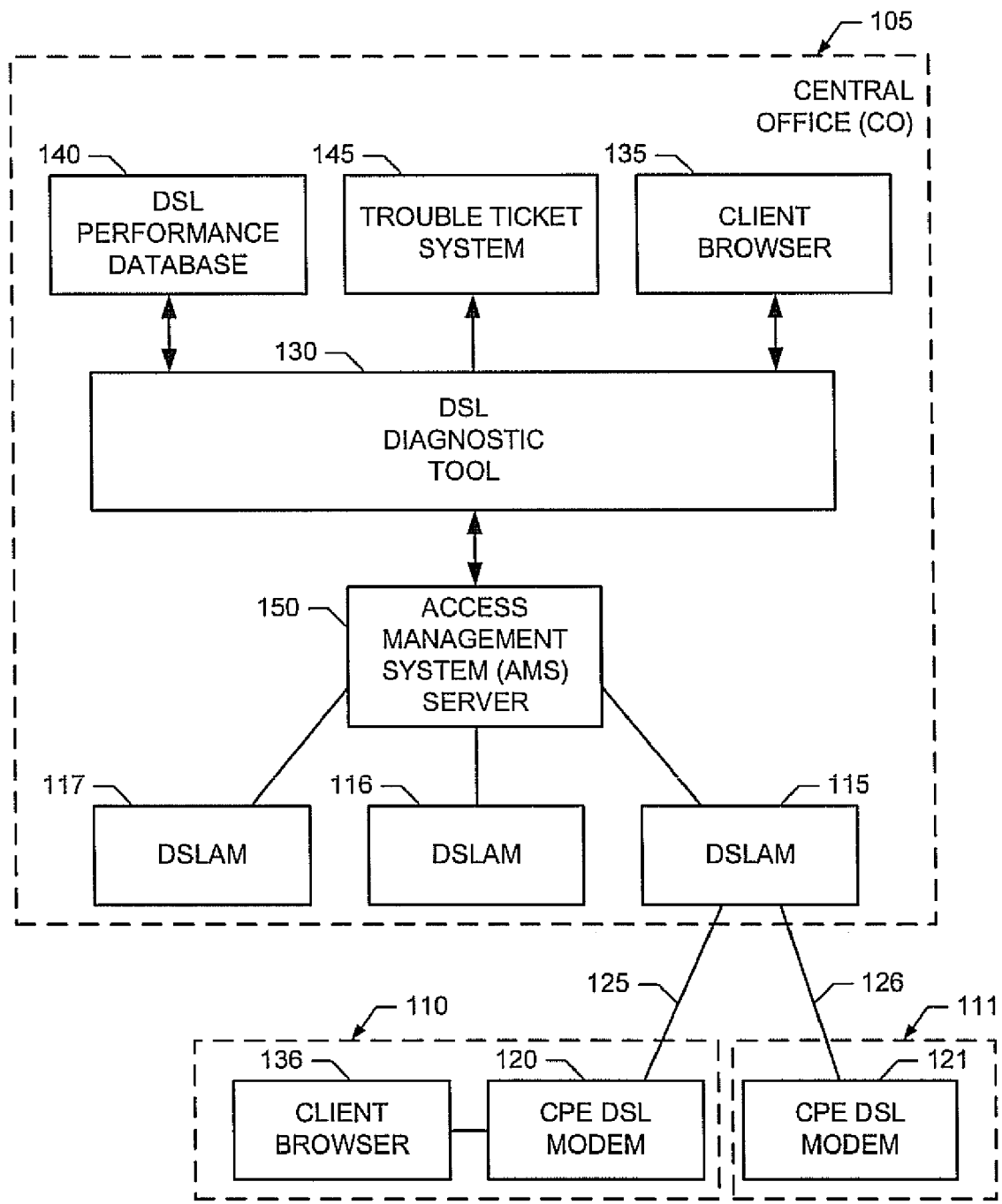
FIG. 1 is a schematic illustration of an example digital subscriber line (DSL) communication system constructed in accordance with the teachings of the invention.

Digital subscriber line (DSL) diagnostic tools and methods to use the same are disclosed. A disclosed example DSL diagnostic tool includes a data collector to automatically collect real-time performance data associated with a subscriber, a database interface module to automatically collect historical data associated with the subscriber and to collect performance data associated with a neighbor subscriber line, a data analyzer to automatically analyze the real-time and historical performance data associated with the subscriber and the performance data associated with the neighbor subscriber line to identify a potential problem with an analyzed subscriber line associated with the subscriber, and a trouble ticket system interface module to automatically submit a repair ticket when the data analyzer does not identify a potential problem.

A disclosed example method of analyzing the performance of a first digital subscriber line (DSL) subscriber line includes collecting real-time performance data associated with the first subscriber line, collecting historical data associated with the first subscriber line and to collect performance data associated with a neighbor subscriber line, analyzing the real-time and historical performance data associated with the first subscriber line and the performance data associated with the neighbor subscriber line to automatically identify a potential problem with the first subscriber line, and automatically submitting a repair ticket when the potential problem is not automatically determined.

A disclosed example digital subscriber line (DSL) communication system includes a subscriber line to communicatively couple a customer premises DSL modem to a DSL access multiplexer, a trouble ticket system, and a DSL diagnostic tool to collect performance data associated with the subscriber line and a neighbor subscriber line, to automatically analyze the collected performance data to identify a potential problem with the subscriber line, and to automatically submit a repair ticket when the potential problem is not automatically identified.

In the interest of brevity and clarity, throughout the following disclosure references will be made to connecting a digital subscriber line (DSL) modem and/or a DSL communication service to a customer premises, customer and/or subscriber. However, it will be readily apparent to persons of ordinary skill in the art that connecting a DSL modem to a customer premises, customer and/or subscriber involves, for example, connecting a first DSL modem operated by a communications company (e.g., a central office (CO) DSL modem implemented by a DSL access multiplexer (DSLAM)) to a second DSL modem located at, for example, a customer-premises (e.g., a home and/or place of business owned, leased and/or operated by a customer) via a twisted-pair telephone line (i.e., a subscriber line). The customer-premises (e.g., the second) DSL modem may be further connected to other communication and/or computing devices (e.g., a personal computer, a set-top box, etc.) that the customer uses and/or operates to access a service (e.g., Internet access, Internet protocol (IP) Television (TV), etc.) via the CO DSL modem, the customer-premises DSL modem, the subscriber line and the communications company.

Moreover, while methods and apparatus to test a subscriber line for a DSL service are described herein, persons of ordinary skill in the art will readily appreciate that the example methods and apparatus may, additionally or alternatively, be used to test other wires and/or cables for other communication services. Other example wires and/or cables include, but are not limited to, those associated with public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, passive optical network (PON) systems, and/or any combination and/or hybrid of these devices, systems and/or networks.

FIG. 1 illustrates an example DSL communication system in which a central office (CO) 105 provides data and/or communication services (e.g., telephone services, Internet services, data services, messaging services, instant messaging services, electronic mail (email) services, chat services, video services, audio services, gaming services, etc.) to one or more customer-premises, two of which are designated at reference numerals 110 and 111. To provide DSL communication services to the customer-premises 110 and 111, the example CO 105 of FIG. 1 includes any number and/or type(s) of DSLAMs (three of which are designated at reference numerals 115, 116 and 117) and the example customer-premises 110 and 111 includes any type(s) of DSL modems 120 and 121. The example DSLAMs 115-117 of FIG. 1 include and/or implement one or more CO DSL modems (not shown) for respective ones of the customer-premises locations 110 and 111. The example DSLAMs 115-117, the CO DSL modems within the DSLAMs 115-117, and/or the example DSL modems 120 and 121 of FIG. 1 may be implemented, for example, in accordance with the ITU-T G.993.x family of standards for very high-speed DSL (VDSL).

In the illustrated example of FIG. 1, the DSLAM 115 provides DSL services to the DSL modems 120 and 121 via respective subscriber lines 125 and 126. Subscriber lines are sometimes also referred to in the industry as "wire-pairs" and/or "loops." While throughout this disclosure reference is made to the example subscriber lines 125 and/or 126 of FIG. 1, persons of ordinary skill in the art will readily appreciate that a subscriber line (e.g., either or both of the example subscriber lines 125 and 126) used to provide a DSL service to a customer-premises location (e.g., either or both of the locations 110 and 111) may include and/or be constructed from one or more segments of twisted-pair telephone wire (e.g., a combination of a feeder one (F1) cable, a distribution cable, a drop cable, and/or customer-premises wiring), terminals and/or distributions points (e.g., a serving area interface (SAI), a serving terminal, a vault and/or a pedestal). Such segments of twisted-pair telephone wire may be spliced and/or connected end-to-end, and/or may be connected at only one end thereby creating one or more bridged-taps. Regardless of the number, type(s), gauge(s) and/or topology of twisted-pair telephone wires used to construct the example subscriber lines 125 and 126, they will be referred to herein in the singular form, but it will be understood that the term "subscriber line" may refer to one or more twisted-pair telephone wire segments and may include one or more bridged taps.

In traditional DSL communication systems, DSL services are installed, tested and/or diagnosed using a series of manual and, thus, inherently error-prone diagnostic steps. For example to install a DSL service, a technician: a) uses a handheld and/or portable device to measure the quality of a subscriber line, b) connects a DSL modem to the subscriber line, c) obtains performance data from the DSL modem using a data acquisition tool, and d) writes the data down for further analysis. If the technician feels the performance data may represent a problem with the newly installed DSL service they have to manually collect additional data (e.g., for neighbor DSL lines), analyze the additional data and, if a problem cannot be readily identified, submit a repair ticket. Such traditional processes are inherently error prone and have success rates that are highly dependent on the experience of the technician. Moreover, traditional methods are focused on a particular subscriber line and, thus, may not correctly and/or readily identify a problem affecting multiple subscriber lines. When such common problems are not rapidly identified and/or addressed, perceived customer satisfaction may be negatively impacted.

To test a subscriber line (e.g., one of the example subscriber lines 125 and/or 126), the example DSL communication system of FIG. 1 includes a DSL diagnostic tool 130. In response to a subscriber and/or customer identifier (e.g., provided by a technician, service person and/or customer-service person via a web-based client browser 135 and/or 136 when a DSL service associated with the identifier is being installed, tested and/or diagnosed), the example DSL diagnostic tool 130 of FIG. 1 automatically collects historical and/or real-time performance data associated with the identifier (e.g., collected from one of the example DSLAMs 115-117, a customer-premises DSL modem 120, 121 associated with the identifier, and/or a DSL performance database 140). Using the collected performance data, the example DSL diagnostic tool 130 attempts to automatically identify a potential problem (e.g., a bridged tap, a cable fault, cross-talk, electromagnetic interference, etc.) for the subscriber line associated with the identifier. If a potential problem can be automatically identified, the example DSL diagnostic tool 130 provides the identified potential problem to the user of the web-based client browser 135, 136 via which the subscriber identifier was provided. If a potential problem cannot be automatically identified, the example DSL diagnostic tool 130 of FIG. 1 automatically generates and/or submits a repair ticket to a trouble ticket system 145 so that an appropriate technician can be dispatched to further diagnose the problem. An example manner of implementing the example DSL diagnostic tool 130 of FIG. 1 is described below in connection with FIG. 2.

The example DSL diagnostic tool 130 of FIG. 1 may, additionally or alternatively, collect performance data associated with neighbor subscriber lines associated with the particular subscriber line being installed, tested and/or diagnosed. Example neighbor subscriber lines are subscriber lines that share all or any part(s) of an F1 cable, a distribution cable, a drop cable, a wiring terminal and/or a distributions point (e.g., a serving area interface (SAI), a serving terminal, a vault and/or a pedestal) with the subscriber line being investigated. Because neighbor subscriber lines share at least part of a cable, terminal and/or distribution point, performance data associated with one or more neighbor subscriber lines can be compared with performance data associated with the subscriber line to identify a potential problem with the given subscriber line and/or to identify a potential problem that affects more than one subscriber line. The correlation and/or consistency of subscriber line performance data can be used to automatically identify a most probable network element and/or network location (e.g., a wiring terminal hit by a vehicle thus affecting multiple subscribers, or a fault in a drop cable affecting a single subscriber) that is in need of repair. For example, if the subscriber line and the neighbor subscriber lines each have current performance data that is worse than their historical performance data by a threshold, then a problem (if it exist) likely affects more than just the subscriber line being analyzed. In another example, when the performance of the subscriber line falls below the performance of each of its neighbor subscriber lines by a threshold amount, the potential problem is identified as only affecting the subscriber line. When a repair is affected, the repair may, in fact, restore (and/or improve) DSL service to more than one subscriber line, even though an initial service disruption notification was received for a single subscriber line.

To collect performance data from the example DSLAMs 115-117 and/or customer-premises DSL modems 120, 121 communicatively couple to the DSLAMs 115-117, the example CO 105 of FIG. 1 includes an access management system (AMS) server 150. The example AMS server 150 provides and/or implements an application programming interface (API) via which the example DSL diagnostic tool 130 can obtain performance data associated with a particular port (e.g., a particular CO DSL modem) of a DSLAM 115-117 and/or a customer-premises DSL modem 120, 121 communicatively coupled to the DSLAM port. The example AMS server 150 accesses and/or uses one or more APIs implemented and/or provided by the DSLAMs 115-117 to obtain the performance data from the DSLAMs 115-117.

To identify a customer-premises DSL modem 120, 121 and/or a DSLAM port associated with a subscriber identifier, the example DSL diagnostic tool 130 of FIG. 1 queries the example DSL performance database 140. In addition to storing historical and/or real-time performance data associated with each of a plurality of subscriber lines (e.g., estimated loop lengths, DSL connection rates, loop attenuation values, error rates, signal-to-noise ratios, bit allocations, noise margins, maximum attainable data rates, DSL modem configurations, etc.), the example DSL performance database 140 stores associations of subscriber identifiers to DSLAM ports.

As illustrated in FIG. 1, a client browser 136 used to access, control and/or use the example DSL diagnostic tool 130 may be communicatively coupled to the DSL diagnostic tool 130 via a customer-premises DSL modem 120, a subscriber line 135 and/or a DSLAM 115. Additionally or alternatively, a client browser 135 may be coupled to the DSL diagnostic tool 130 via one or more private and/or public communication network(s) (e.g., a local area network (LAN)) implemented within and/or by the example CO 105.

While in the illustrated example of FIG. 1, the example DSLAMs 115-117, the example DSL diagnostic tool 130, the example client browser 135, the example DSL performance database 140, the example trouble ticket system 145 and the example AMS server 150 are illustrated in connection with the example CO 105, one or more of the DSL diagnostic tool 130, the client browser 135, the DSL performance database 140, the trouble ticket system 145 and/or the AMS server 150 may be located and/or implemented separately from the CO 105. For example, the DSL diagnostic tool 130, the client browser 135, the DSL performance database 140, and/or the trouble ticket system 145 may be located and/or implemented at a customer service location (not shown), which is communicatively coupled to the AMS 150 at the CO 105. Further any number of DSLAMs 115-117 may be implemented and/or located at a CO. Moreover, a DSLAM 115-117 may be implemented and/or located at a remote terminal (not shown), which is communicatively coupled to the example DSL diagnostic tool 130 via an AMS server (e.g., the example AMS server 150 at a CO (e.g., the example CO 105).

Figure 2:
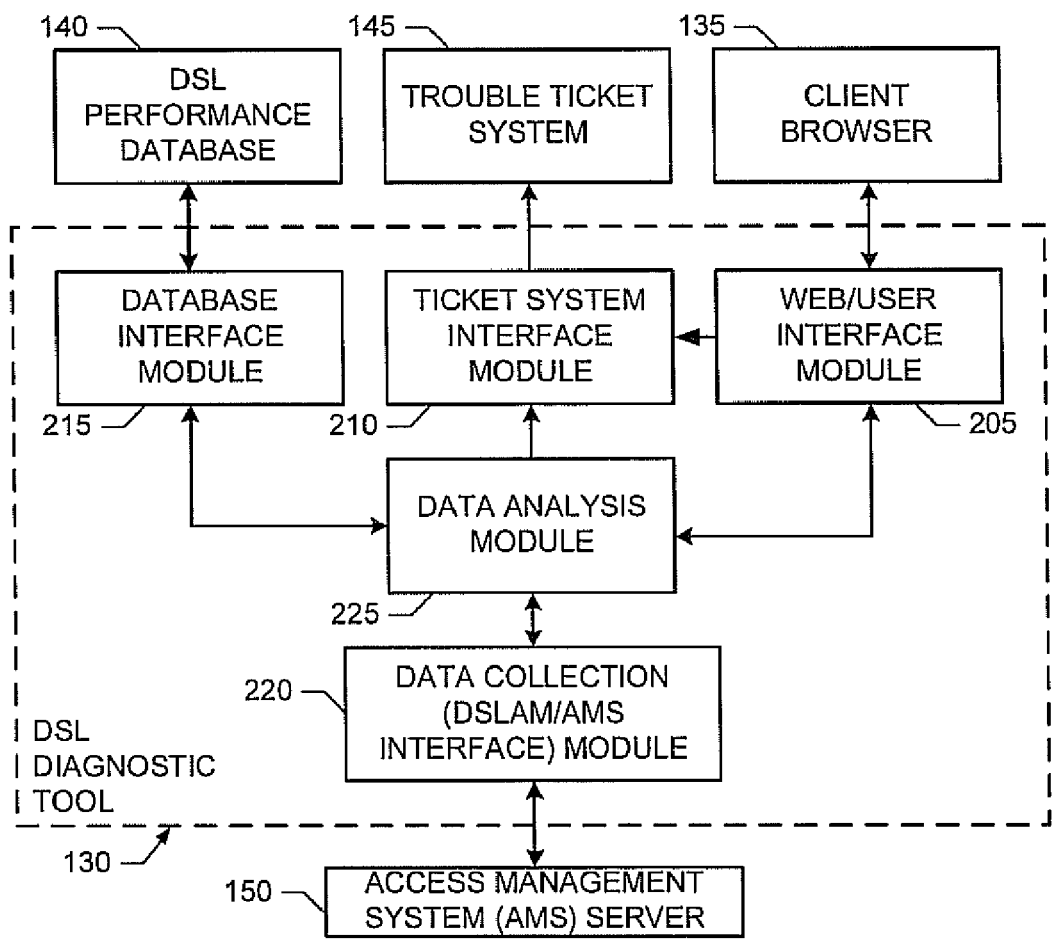
FIG. 2 illustrates an example manner of implementing the example DSL diagnostic tool of FIG. 1.

FIG. 2 illustrates an example manner of implementing the example DSL diagnostic tool 130 of FIG. 1. To provide a user interface, the example DSL diagnostic tool 130 of FIG. 2 includes a web-based user interface module 205. The example web-based user interface module 205 of FIG. 2 presents one or more user interfaces (e.g., the example user interfaces of FIGS. 4-7) that allow a user of a client browser 135 (and/or the example client browser 136 of FIG. 1) to provide a subscriber identifier and/or to receive performance and/or diagnostic data and/or information associated with a provided subscriber identifier.

To interact with the example trouble ticket system 145, the example DSL diagnostic tool 130 of FIG. 2 includes a ticket system interface module 210. The example ticket system interface module 210 of FIG. 2 generates and/or submits repair tickets for a subscriber identifier received via the example web-based user interface module 205. In some examples, the ticket system interface module 210 includes performance data associated with a subscriber identifier, its neighbor subscriber lines, and/or one or more parameters and/or diagnostic information determined and/or estimated (e.g., computed) based on the performance data. Included information may be used by, for example, a repair technician while diagnosing a reported problem.

To interact with the example performance database 140, the example DSL diagnostic tool 130 of FIG. 2 includes a database interface module 215. The example database interface module 215 of FIG. 2 implements one or more APIs to allow other elements of the example DSL diagnostic tool 130 to perform queries of the example performance database 140. Example queries include: a) to obtain a DSLAM port identifier associated with a subscriber identifier, b) to obtain historical performance data associated with a subscriber identifier, c) to obtain historical performance data associated with a neighbor subscriber line, and/or d) to store collected real-time performance data.

To collect data from a DSLAM (e.g., any of the example DSLAMS 115-117 of FIG. 1), the example DSL diagnostic tool 130 of FIG. 2 includes a data collection module 220. The example data collection module 220 of FIG. 2 accesses an API implemented and/or provided by the example AMS server 150 to obtain current and/or real-time performance data for one or more ports of a DSLAM.

To analyze performance data, the example DSL diagnostic tool 130 of FIG. 2 includes a data analysis module 225. When a subscriber identifier is received via the example web-based user interface 205, the example data analysis module 225 of FIG. 2 directs the database interface module 215 to perform a query of the example DSL performance database 140 to determine which DSLAM port is associated with the subscriber identifier. The example data analysis module 225 then automatically collects real-time performance data from the identified DSLAM port via the data collection module 220, and performs another query of the DSL performance database 140 to obtain historical performance data associated with the subscriber identifier and/or DSLAM port. Based on the collected real-time and/or historical performance data, the data analysis module 225 attempts to automatically identify a potential problem (e.g., a bridged tap, a cable fault, cross-talk, electromagnetic interference, etc.) for the subscriber line associated with the identifier. If a potential problem can be automatically identified by the data analysis module 225, the example web-based user interface module 205 provides the identified potential problem to the user of the web-based client browser 135. If a potential problem cannot be automatically identified, the example ticket system interface module 210 automatically generates and/or submits a repair ticket to the example trouble ticket system 145 so that one or more appropriate technicians can be dispatched to further diagnose the problem. An example manner of implementing the example data analysis tool 225 of FIG. 2 is described below in connection with FIG. 3.

The example data analysis tool 225 of FIG. 2 may, additionally or alternatively, perform one or more additional queries of the DSL performance database 140 to collect performance data associated with one or more subscriber lines that neighbor the subscriber identifier. A neighbor subscriber line is any line in physical proximity to the subscriber line in question anywhere along the length of the subscriber line. Thus, a neighbor line need not, but may be, coupled to a neighboring customer premises. If a comparison of the performance data associated with the subscriber identifier and performance data associated with one or more neighbor subscriber lines permits the data analysis module 225 to automatically determine a potential problem, the web-based user interface module 205 provides the identified potential problem to the user of the web-based client browser 135. If a potential problem cannot be automatically identified, the example ticket system interface module 210 automatically generates and/or submits a repair ticket to the example trouble ticket system 145 so that one or more appropriate technicians can be dispatched to further diagnose the problem.

While an example manner of implementing the example DSL diagnostic tool 130 of FIG. 1 has been illustrated in FIG. 2, one or more of the elements, processes and/or devices illustrated in FIG. 2 may be combined, divided, re-arranged, omitted, eliminated and/or implemented in any other way. Further, the example web-based user interface module 205, the example ticket system interface module 210, the example database interface module 215, the example data collection module 220, the example data analysis module 220 and/or, more generally, the example DSL diagnostic tool 130 of FIG. 2 may be implemented by hardware, software, firmware and/or any combination of hardware, software and/or firmware. Further still, the example DSL diagnostic tool 130 may include one or more elements, processes and/or devices in addition to, or instead of, those illustrated in FIG. 2, and/or may include more than one of any or all of the illustrated elements, processes and devices.

Figure 3:
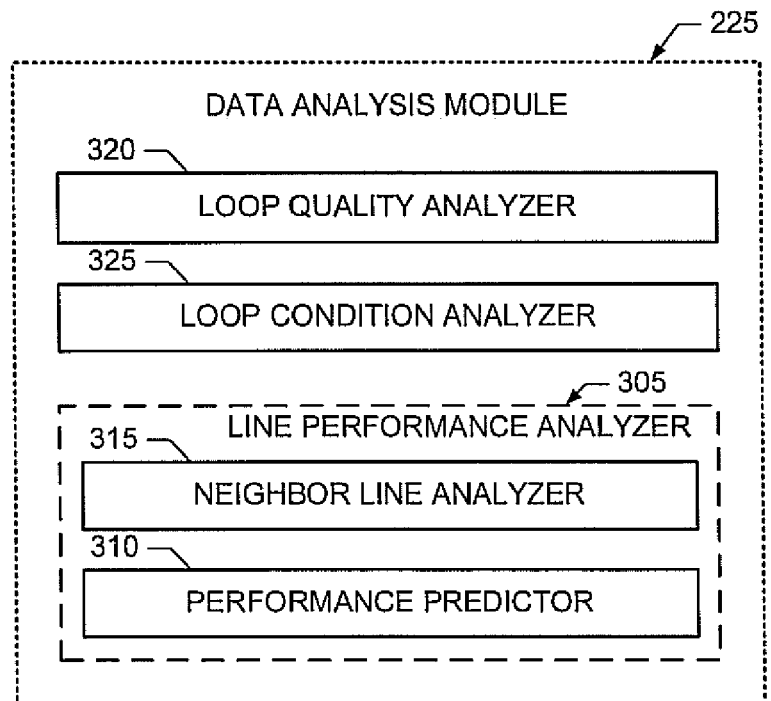
FIG. 3 illustrates an example manner of implementing the example data analysis module of FIG. 2.

FIG. 3 illustrates an example manner of implementing the example data analysis module 225 of FIG. 2. To characterize the performance of a subscriber line (e.g., any of the example subscriber lines 125 and 126 of FIG. 1), the example data analysis module 225 of FIG. 3 includes a line performance analyzer 305. To analyze performance data associated with a particular subscriber line, the example line performance analyzer 305 of FIG. 3 includes a performance predictor 310. Using any of a number of algorithm(s), method(s) and/or logic, the example performance predictor 310 of FIG. 3 analyzes and/or compares historical and/or current performance data associated with a subscriber line to determine any of a number of parameters. Example parameters include, but are not limited to an application quality degradation (e.g., transmission control protocol (TCP) throughput decrease, video and/or voice quality decrease, etc.) and/or line profile parameters (e.g., a DSL connection rate, an amount of interleaving to be used, an error correction coding setting, etc.). For example, if the number of errors associated with a subscriber line has increased, the example performance predictor 315 may recommend that interleaving be enabled for the subscriber line.

To compare the performance data associated with two or more subscriber lines, the example line performance analyzer 305 includes a neighbor line analyzer. The example neighbor line analyzer 310 of FIG. 3 compares historical and/or real-time performance data of two or more subscriber lines to attempt to automatically identify whether a potential problem may be affecting some or all of the compared subscriber lines. For example, if all of a set of subscriber lines have lower current performance compared to historical averages (e.g., a decrease in performance that exceeds a threshold), a common network problem is likely affecting these modems.

To characterize the configuration of a subscriber line, the example data analysis module 225 of FIG. 3 includes a loop quality analyzer 320. Using any method(s), algorithm(s) and/or logic, and based on collected performance data (e.g., loop attenuation values), the example loop quality analyzer 320 of FIG. 3 estimates one or more parameters of the subscriber line (e.g., loop length, bridged tap length, cable fault, cable short, cable disconnected/open, bad splice, loading coil, etc.).

Example methods and apparatus to estimate one or more parameter of a subscriber line given one or more signal attenuation values are described in U.S. patent application Ser. No. 11/751,353, filed on May 21, 2007, and entitled "Methods and Apparatus to Characterize a Digital Subscriber Line (DSL) Subscriber Loop." U.S. patent application Ser. No. 11/751,353 is hereby incorporated by reference in its entirety.

To identify operating conditions of a subscriber line, the example data analysis module 225 of FIG. 3 includes a loop condition analyzer 325. Using any method(s), algorithm(s) and/or logic, and based on collected performance data (e.g., signal-to-noise ratios, bit allocations, etc.), the example loop condition analyzer 325 of FIG. 3 estimates the presence of one or more environmental conditions (e.g., crosstalk, electromagnetic interference, AM radio signals, interference from home electronic devices, etc.) that may be affecting the performance of the subscriber line. For example, a DSL signal's bit allocation may be used to detect and/or estimate the presence of different types of crosstalk and/or interference by a) identifying dips and/or peaks in a bit allocation and/or b) correlating the shape and/or location of the dips and/or peaks with different types of crosstalk and/or interference. For instance, a DSL signal that is generally free of crosstalk has a bit distribution that peaks between 170 kHz and 300 kHz, and gradually decreases for higher frequencies. However, if crosstalk due to a nearby integrated services digital network (ISDN) signal is present, then the peak of the DSL signal's bit allocation will peak either below 70 kHz or above 300 kHz facilitating detection of the ISDN crosstalk.

While an example manner of implementing the example data analysis module 225 of FIG. 2 has been illustrated in FIG. 3, one or more of the elements, processes and/or devices illustrated in FIG. 3 may be combined, divided, re-arranged, omitted, eliminated and/or implemented in any other way. Further, the example line performance analyzer 305, the example performance predictor 310, the example neighbor line analyzer 315, the example loop quality analyzer 320, the example loop condition analyzer 325 and/or, more generally, the example data analysis module 225 of FIG. 3 may be implemented by hardware, software, firmware and/or any combination of hardware, software and/or firmware. Further still, the example analysis module 225 of FIG. 3 may include one or more elements, processes and/or devices in addition to, or instead of, those illustrated in FIG. 3, and/or may include more than one of any or all of the illustrated elements, processes and devices.

FIGS. 4, 5A, 5B, 6 and 7 illustrate example user interfaces that may be used to implement the example web-based user interface module 205 and/or, more generally, any or all of the example DSL diagnostic tools of FIGS. 1 and/or 2. To allow a user to identify a subscriber, the example user interface of FIG. 4 includes two text entry boxes 405 and 410. The example text entry box 405 of FIG. 4 may be used to enter and/or otherwise provide a customer and/or subscriber identifier. The example text entry box 410 of FIG. 4 may be used to enter and/or otherwise provide a residential gateway (RG) serial number.

Figure 4:
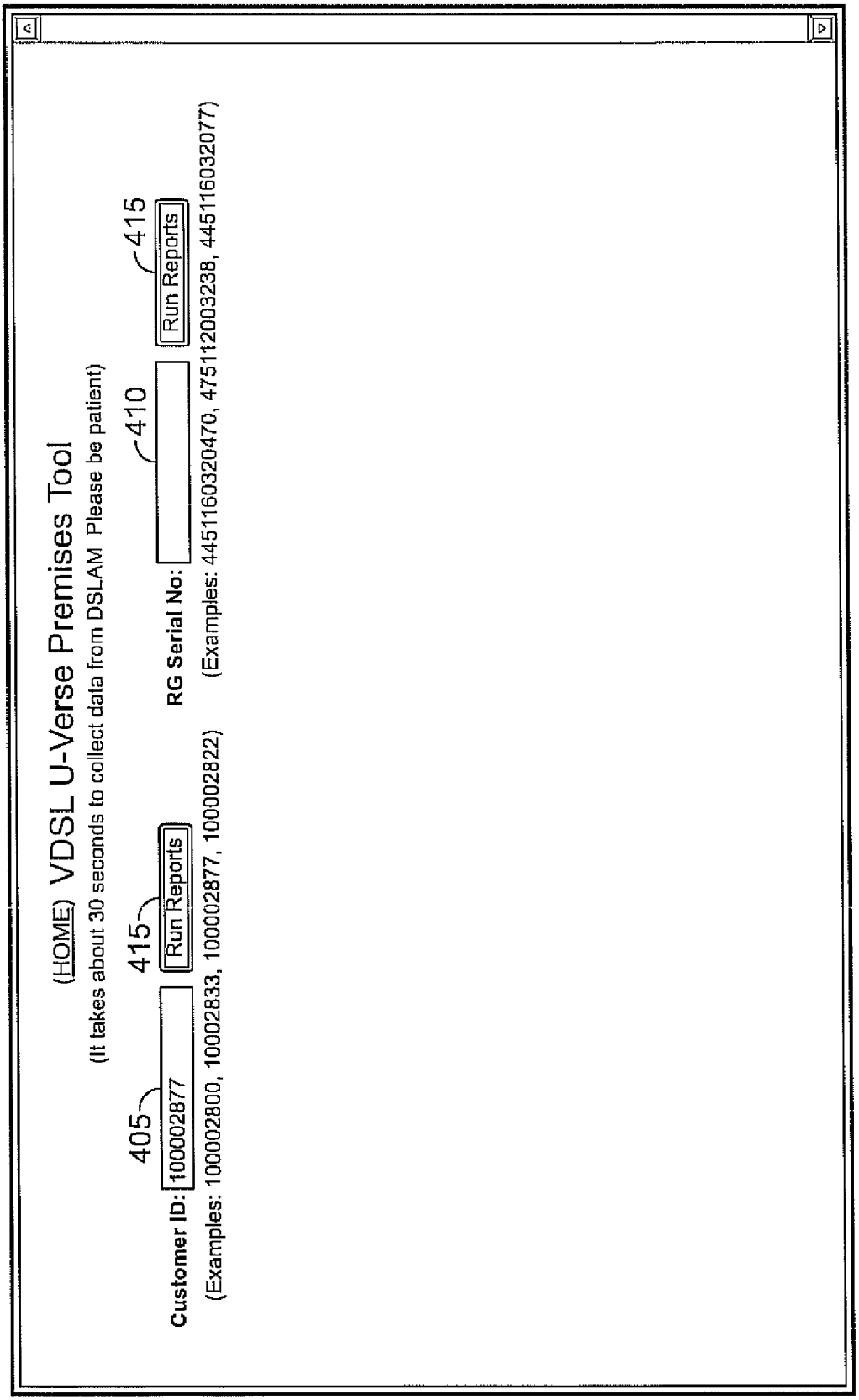

To initiating testing and/or diagnosis of a subscriber line associated with a specified subscriber identifier and/or RG serial number, the example user interface of FIG. 4 includes buttons 415 and 420. Either of the example buttons 415 and 420 may be selected (e.g., by clicking on them with a mouse) to initiate testing and/or diagnostics. While the example user interface of FIG. 4 includes two buttons 415 and 420, some user interfaces may include only one button.

Figure 5A:
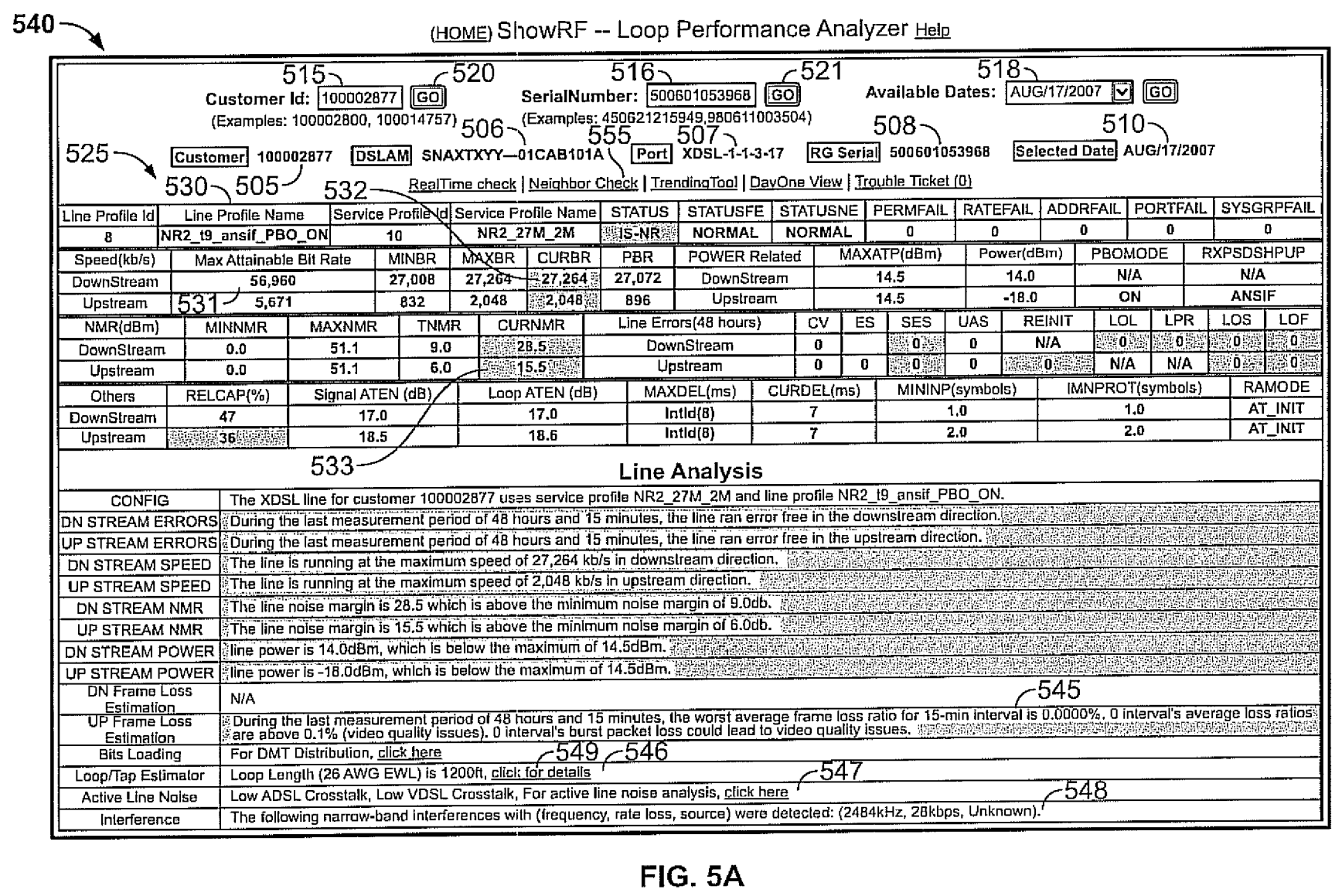

FIGS. 5A and 5B collectively illustrate an example user interface that may be used to present the results of automated testing of a subscriber line. In some instances, the illustrated examples of FIGS. 5A and 5B are presented together as a single user interface. However, for ease of illustration, such a single user interface has been split into two figures. To identify the subscriber line that was analyzed, the example user interface of FIG. 5A includes one or more information fields, four of which are designated at reference numerals 505, 506, 507 and 508. The example customer identification field 505 of FIG. 5A contains a subscriber and/or customer identifier. The example DSLAM identification field 506 of FIG. 5A contains a DSLAM identifier. The example DSLAM port identification field 507 of FIG. 5A contains a DSLAM port identifier. The example RG identification field 508 of FIG. 5A contains a RG serial number. To identify when the analysis was performed, the example user interface of FIG. 5A includes a date field 510. The example date field 510 of FIG. 5A contains an alphanumeric string representative of a date.

To allow a user to identify a different subscriber, the example user interface of FIG. 5A includes two text entry boxes 515 and 516. The example text entry box 515 of FIG. 5A may be used to enter and/or otherwise provide a customer and/or subscriber identifier. The example text entry box 516 of FIG. 5A may be used to enter and/or otherwise provide a residential gateway (RG) serial number. To allow the user to specify a day (present and/or past) for which performance data should be collected and analyzed, the example user interface of FIG. 5A includes a date selection drop-down box 518. The example drop-down selection box 518 of FIG. 5A allows a user to select a date from a list of available dates.

To initiating testing and/or diagnosis of a subscriber line associated with a specified subscriber identifier, RG serial number and/or date, the example user interface of FIG. 5A includes buttons 520 and 521. Either of the example buttons 520 and 521 of FIG. 5A may be selected (e.g., by clicking on them with a mouse) to initiate testing and/or diagnostics. While the example user interface of FIG. 5A includes two buttons 520 and 521, some user interfaces may include only one button.

To provide performance data and/or information (e.g., current and/or for a selected date), the example user interface of FIG. 5A includes a table 525. The example table 525 of FIG. 5A includes a number of fields that contain data and/or information representative of the settings of the DSL service, the maximum attainable capabilities of the subscriber line and/or the performance of the DSL service. For instance, an example field 530 represents the current DSL line profile in use, an example field 531 represents the maximum attainable downstream data rate, an example field 532 represents the active downstream data rate, and an example field 533 represents the noise margin for the active downstream data rate.

To provide results of performance prediction, loop quality, and/or loop condition analysis, the example user interface of FIG. 5A includes a table 540. The example table 540 of FIG. 5A includes a number of fields that represent the predicted performance of applications, estimated loop quality and/or estimated loop conditions encountered by the subscriber line. For instance, an example field 545 indicates that during the past 48 hours and 15 minutes that the worst average frame rate loss rate was 0.0000% and, thus, no video quality issues are predicted, an example field 546 indicates that the estimate loop length is 12000 feet, an example field 547 indicates that there are low amounts of crosstalk, and an example field 548 indicates that narrow-band interference was detected at 2484 kHz that is causing an estimate 20 thousand bits per second (kbps) performance degradation. The example field 546 of FIG. 5A also includes a selectable element 549 that allows the user to view more information regarding the estimated composition of the subscriber loop. The example selectable element 549 of FIG. 5A initiates the display of the example user interface of FIG. 7.

To provide error information, the example user interface of FIG. 5B includes a table 550. The example table 550 of FIG. 5B contains error count values for a number of types of error events for a plurality of 15-minute intervals.

To initiate a comparison of the identified subscriber line to its neighbor subscriber lines, the example user interface of FIG. 5A includes a selectable button 555. The example button 555 of FIG. 5A initiates the display of the example user interface of FIG. 6.

The example user interface of FIG. 6 displays performance data for respective ones of a selected subscriber line 605 and one or more neighbor subscriber lines 606 and 607. To identify a location, each of the example entries 605-607 of FIG. 6 includes an address field 610. Each of the example address fields 610 of FIG. 6 includes an alphanumeric string representative of a particular physical (e.g., geographical) address of customer premises.

To specify the current performance of the subscriber lines, each of the example entries 605-607 of FIG. 6 includes a line performance field 615. Each of the example line performance fields 615 of FIG. 6 includes a string (e.g., Unknown, Good, Marginal and/or Error) that generally represents how the DSL service for the customer premises is operating.

To allow a user to review test, analysis and/or diagnostic results for a particular subscriber line, each of the example entries 605-607 of FIG. 6 includes a selectable element 620. Each of the example selectable elements 620 initiates the example user interface of FIGS. 5A and 5B for a particular subscriber line.

Figure 7:
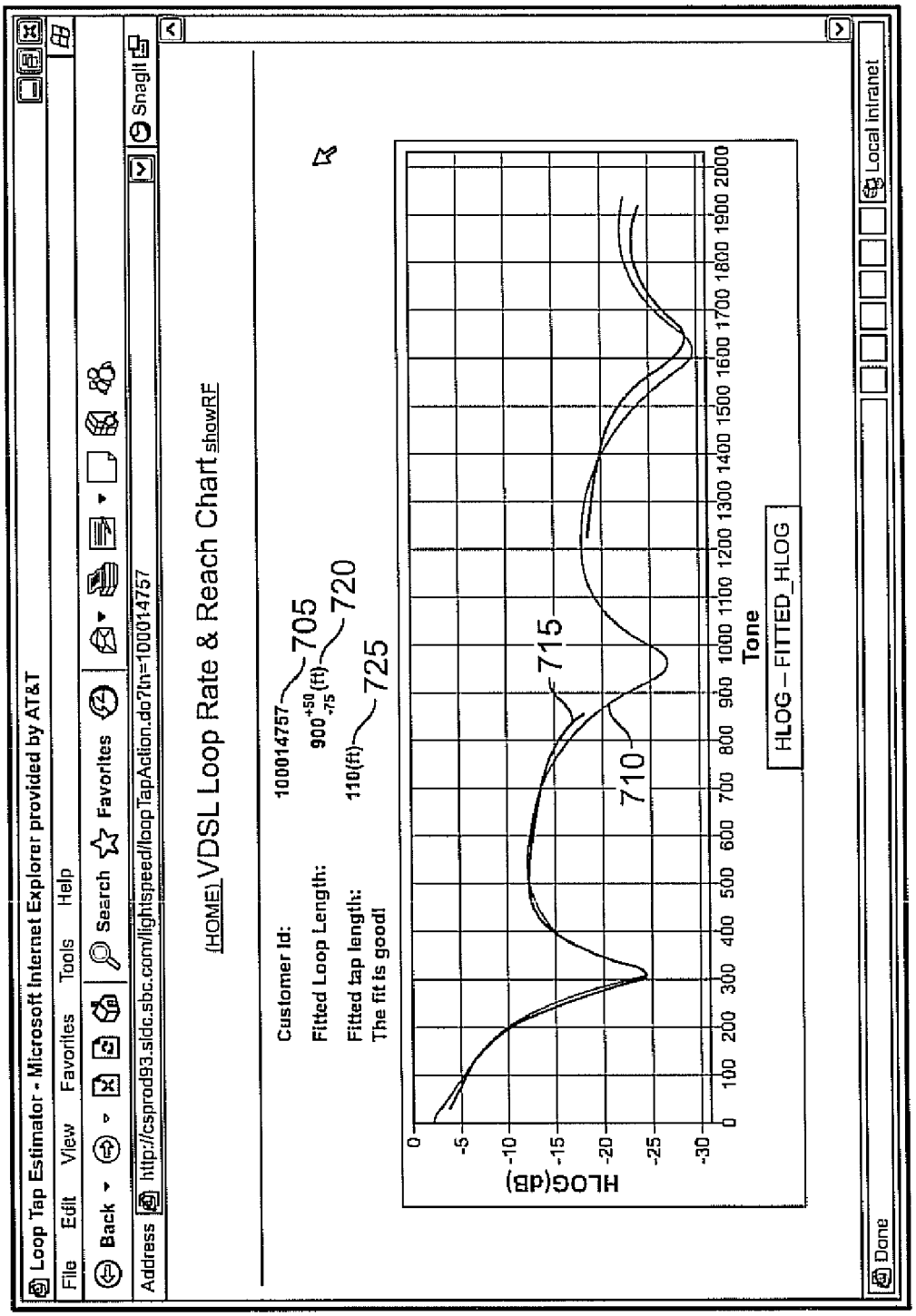

The example user interface of FIG. 7 illustrates example loop quality analysis results for a DSL subscriber loop 705 that includes a bridged tap. The example user interface of FIG. 7 includes a plot of measured loop attenuation values 710 (e.g., collected by the example data collection module 220 of FIG. 2) and a plot of computed loop attenuation values 715 that most closely match the measured loop attenuation values 710. The example user interface of FIG. 7 also displays the estimated length 720 of the DSL subscriber loop 720 and an indication 725 indicating whether a bridged tap was found and providing the estimated length of the bridged tap (if found). In the illustrated example of FIG. 7, the estimated length 720 also includes information concerning the estimated accuracy of the result. For instance, the estimated length 720 of the DSL subscriber loop 705 is between 825 ft. and 950 ft.

Figure 8:
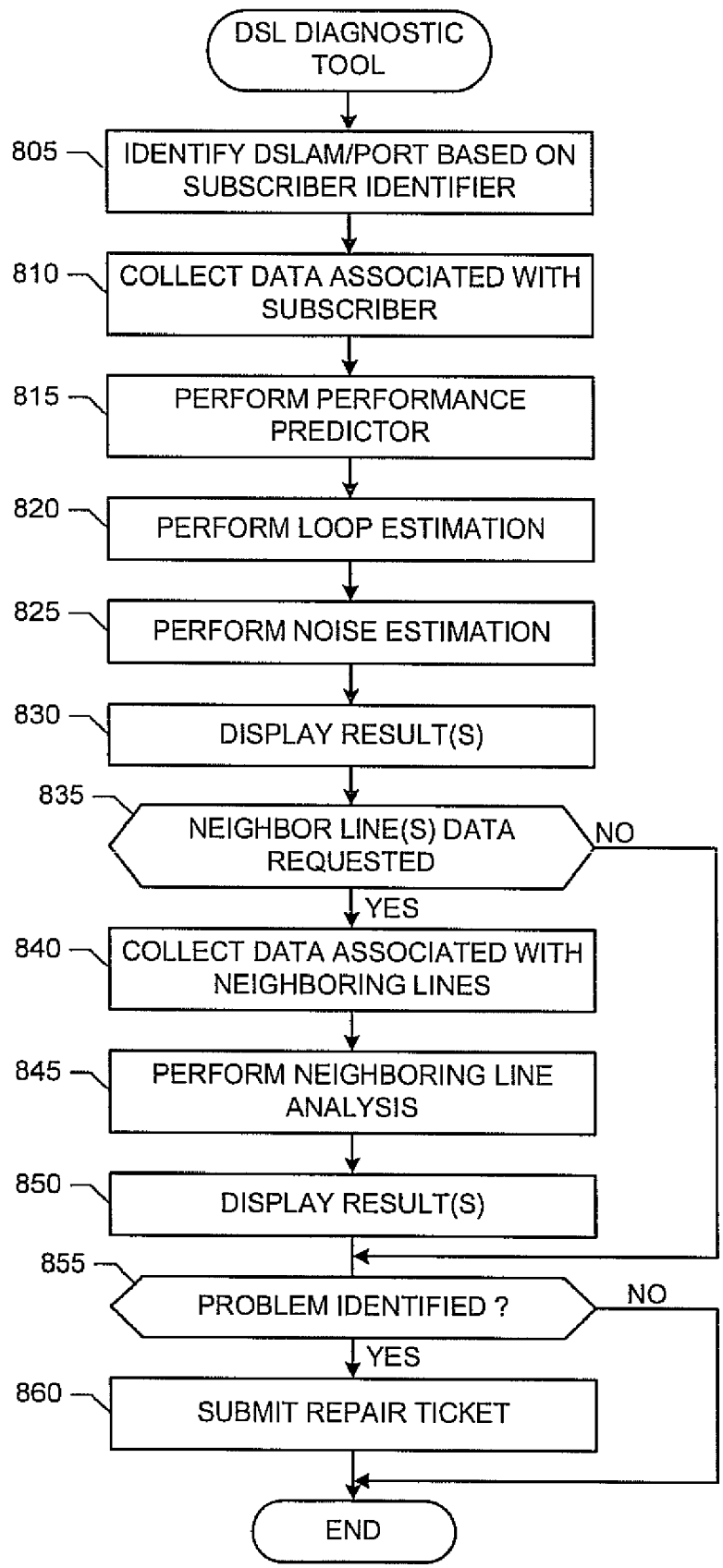
FIG. 8 is a flowchart representative of an example process that may be carried out by, for example, a processor to implement any or all of the example DSL diagnostic tools of FIGS. 1 and/or 2.

FIG. 8 is a flowchart representative of machine accessible instructions that may be carried out to implement any or all of the example DSL diagnostic tools of FIGS. 1 and/or 2. The example machine accessible instructions of FIG. 8 may be carried out by a processor, a controller and/or any other suitable processing device. For example, the example machine accessible instructions of FIG. 8 may be embodied in coded instructions stored on a tangible medium such as a flash memory, a read-only memory (ROM) and/or random-access memory (RAM) associated with a processor (e.g., the example processor 905 discussed below in connection with FIG. 9). Alternatively, some or all of the example machine accessible instructions of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example machine accessible instructions of FIG. 8 may be implemented manually or as any combination of any of the foregoing techniques, for example, any combination of firmware, software, discrete logic and/or hardware. Further, although the example operations of FIG. 8 are described with reference to the flowchart of FIG. 8, persons of ordinary skill in the art will readily appreciate that many other methods of implementing the operations of FIG. 8 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIG. 8 may be carried out sequentially and/or carried out in parallel by, for example, separate processing threads, processors, devices, discrete logic, circuits, etc.

The example machine accessible instructions of FIG. 8 begin when a DSL diagnostic tool (e.g., any of the example DSL diagnostic tools of FIGS. 1 and/or 2) receives an identifier (e.g., a subscriber identifier and/or a residential gateway serial number) provided using, for example, one of the example text entry boxes 405, 410, 515 and/or 516 of FIGS. 4, 5B and/or 5B. The DSL diagnostic tool (e.g., the example database interface module 215) queries a database (e.g., the example DSL performance database 140) to identify the DSLAM port associated with the identifier (block 805). The DSL diagnostic tool (e.g., the example data collection module 220) collects real-time performance data (e.g., via the example AMS server 150), and the database interface module queries the database to obtain historical performance data associated with the identifier (block 810). The DSL diagnostic tool (e.g., the example performance predictor 310 of FIG. 3) then analyses the collected performance data and attempts to automatically identify any potential problems (block 815).

The DSL diagnostic tool (e.g., the example loop quality analyzer 320 of FIG. 3) estimates one or more parameters (e.g., loop length, bridged tap length, etc.) that characterize the topology of the subscriber line (block 820). The DSL diagnostic tool (e.g., the example loop condition analyzer 325) estimates the conditions (e.g., noise) in which the subscriber line is operating (block 825). The DSL diagnostic tool (e.g., the example web-based user interface module 205 of FIG. 2) displays the results of the analyses performed (e.g., by using the example user interface of FIGS. 5A and 5B) (block 830).

If performance data for neighbor subscriber lines is requested (e.g., by selecting the example button 555 of FIG. 5A) (block 835), the database interface module and/or the data collection module collect performance data associated one or more subscriber lines that neighbor the subscriber line (block 840). The DSL diagnostic tool (e.g., the example neighbor line analyzer 315) analyzes and/or compares the performance data collected for the neighbor lines (block 845). The example web-based user interface module displays the results of the analyses performed (e.g., by using the example user interface of FIG. 6) (block 850).

If the data analysis tool could not automatically identify a potential problem (block 855), the DSL diagnostic tool (e.g., the example ticket system interface 210 of FIG. 2) submits a repair ticket (block 860). Control then exits from the example machine accessible instructions of FIG. 8.

Returning to block 835, if performance data for neighbor subscriber lines is not requested (block 835), control proceeds to block 855 without collecting and analyzing neighbor subscriber lines.

Figure 9:
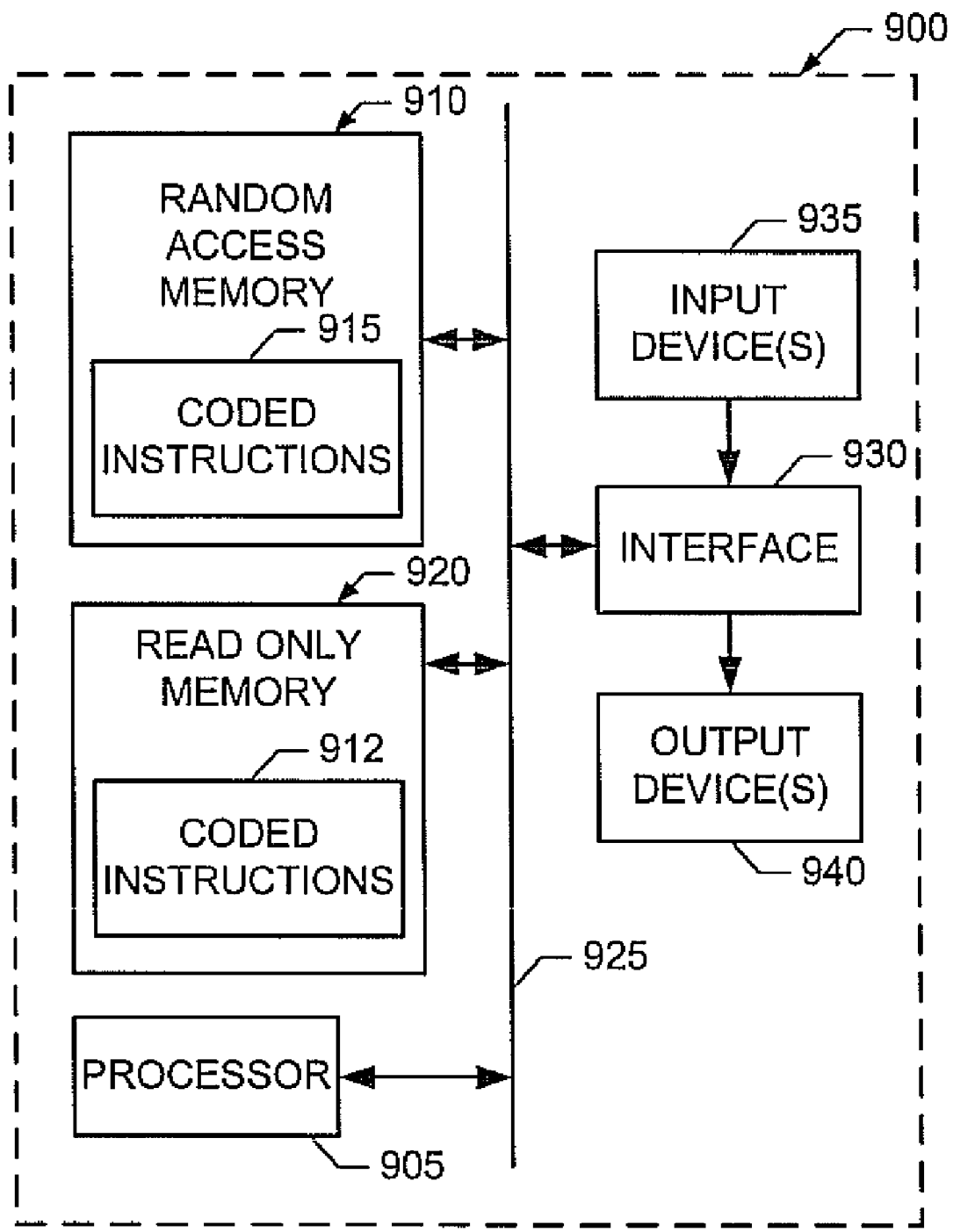
FIG. 9 is a schematic illustration of an example processor platform that may be used and/or programmed to execute the example machine accessible instructions of FIG. 8 to implement any or all of the example DSL diagnostic tools described herein.

FIG. 9 is a schematic diagram of an example processor platform 900 that may be used and/or programmed to implement any portion(s) and/or all of the example DSL diagnostic tools 130 and/or the example data analysis modules 225 of FIGS. 1, 2 and/or 3. For example, the processor platform 900 can be implemented by one or more processors, processor cores, microcontrollers, DSPs, DSP cores, ARM processors, ARM cores, etc.

The processor platform 900 of the example of FIG. 9 includes at least one programmable processor 905. The processor 905 executes coded instructions 910 and/or 912 present in main memory of the processor 905 (e.g., within a RAM 915 and/or a ROM 920). The processor 905 may be any type of processing unit, such as a processor core, a processor and/or a microcontroller. The processor 905 may execute, among other things, the example machine accessible instructions of FIG. 8 to implement any or all of the example DSL diagnostic tools and/or data analysis modules described herein. The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memories 915 and 920 may be controlled by a memory controller (not shown). The memory 915 and/or 920 may be used to, for example, implement the example DSL performance database 140.

The processor platform 900 also includes an interface circuit 930. The interface circuit 930 may be implemented by any type of interface standard, such as a USB interface, a Bluetooth interface, an external memory interface, serial port, general purpose input/output, etc. One or more input devices 935 and one or more output devices 940 are connected to the interface circuit 930. The input devices 935 and/or output devices 940 may be used to implement the example web-based user interface module 205, the example ticket system interface module 210, the example database interface module 215 and/or the example data collection module 220 of FIG. 2.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A digital subscriber line (DSL) diagnostic tool comprising:
   a data collector to collect real-time performance data associated with a subscriber;
   a database interface to collect historical data associated with the subscriber and to collect performance data associated with a neighbor subscriber line;
   a data analyzer to analyze the real-time and historical performance data associated with the subscriber and the performance data associated with the neighbor subscriber line to identify a potential problem with an analyzed subscriber line associated with the subscriber; and
   a trouble ticket system interface to submit a repair ticket in response to the data analyzer does not identify a potential problem, at least one of the data collector, the database interface, the data analyzer, or the trouble ticket system interface comprising a logic circuit.

2. A DSL diagnostic tool as defined in claim 1, further comprising a web-based interface to prompt a user for a subscriber identifier and to present the potential problem to a user.

3. A DSL diagnostic tool as defined in claim 2, wherein the web-based interface is accessible by the user via a customer-premises DSL modem communicatively coupled to the analyzed subscriber line.

4. A DSL diagnostic tool as defined in claim 1, wherein the data collector is to:
   query a database to identify a port of a DSL access multiplexer associated with the subscriber; and
   collect the real-time performance data from the DSL access multiplexer port.

5. A DSL diagnostic tool as defined in claim 1, wherein the data analyzer is to compare the real-time data associated with the subscriber to the performance data associated with the neighbor subscriber line to compare performance of the analyzed subscriber line to the neighbor subscriber line.

6. A DSL diagnostic tool as defined in claim 5, further comprising a web-based interface to prompt a user for a subscriber identifier and to present a result of the comparison.

7. A DSL diagnostic tool as defined in claim 1, wherein the data analyzer comprises:
   a line performance analyzer to analyze the performance data associated with the subscriber and the neighbor subscriber line; and
   a loop condition analyzer to determine whether at least one of crosstalk or electro-magnetic interference is present.

8. A DSL diagnostic tool as defined in claim 7, wherein the data analyzer further comprises a loop quality analyzer to estimate at least one of a loop length, a bridged-tap length or a cable fault.

9. A DSL diagnostic tool as defined in claim 7, wherein the line performance analyzer comprises:
   a performance predictor to determine at least one of an application quality degradation or a line profile adjustment; and
   a neighbor line analyzer to identify an abnormal line condition based on the performance data associated with the subscriber and the neighbor subscriber line.

10. A method of analyzing the performance of a first digital subscriber line (DSL) subscriber line, the method comprising:
    collecting, with a data collector implemented by a processor, real-time performance data associated with the first subscriber line;
    collecting, with a database interface, historical data associated with the first subscriber line and to collect performance data associated with a neighbor subscriber line;
    analyzing, with a data analyzer, the real-time and historical performance data associated with the first subscriber line and the performance data associated with the neighbor subscriber line to identify a potential problem with the first subscriber line; and
    submitting, with a trouble ticket system, a repair ticket in response to the potential problem is not determined.

11. A method as defined in claim 10, further comprising:
    presenting a first user interface to obtain a subscriber identifier; and
    presenting a second user interface to provide the identified potential problem.

12. A method as defined in claim 10, wherein collecting the real-time and the historical performance data associated with the first subscriber line comprises:
    querying a database to identify a DSL access multiplexer port associated with the first subscriber line; and
    collecting the real-time performance data from the DSL access multiplexer port.

13. A method as defined in claim 10, wherein the potential problem is associated with the first subscriber line when a difference between the real-time data associated with the first subscriber line and the performance data associated with the neighbor subscriber line exceeds a threshold.

14. A method as defined in claim 10, further comprising analyzing the performance data associated with the first subscriber line to attempt to identify at least one of crosstalk or electro-magnetic interference.

15. A method as defined in claim 10, further comprising analyzing the performance data associated with the first subscriber line to estimate at least one of a loop length, a bridged-tap length or a cable fault.

16. A method as defined in claim 10, further comprising analyzing the performance data associated with the first subscriber line to determine at least one of an application quality degradation or a line profile adjustment.

17. A method as defined in claim 10, further comprising analyzing the performance data associated with the first subscriber line to identify an abnormal line condition based on the performance data associated with the first subscriber line and the neighbor subscriber line.

18. A tangible article of manufacture storing machine readable instructions which, when executed, cause a machine to at least:
   collect real-time performance data associated with a first digital subscriber line (DSL) subscriber line;
   collect historical data associated with the first subscriber line and to collect performance data associated with a neighbor subscriber line;
   analyze the real-time and historical performance data associated with the first subscriber line and the performance data associated with the neighbor subscriber line to identify a potential problem with the first subscriber line; and
   submit a repair ticket in response to the potential problem is not determined.

19. An article of manufacture as defined in claim 18, wherein the machine accessible instructions, when executed, cause the machine to identify that the potential problem is associated with the first subscriber line when a difference between the real-time data associated with the first subscriber line and the performance data associated with the neighbor subscriber line exceeds a threshold.

20. An article of manufacture as defined in claim 18, wherein the machine accessible instructions, when executed, cause the machine to analyze the performance data associated with the first subscriber line to determine at least one of an application quality degradation or a line profile adjustment.

21. An article of manufacture as defined in claim 18, wherein the machine accessible instructions, when executed, cause the machine to analyze the performance data associated with the first subscriber line to identify an abnormal line condition based on the performance data associated with the first subscriber line and the neighbor subscriber line.

22. A digital subscriber line (DSL) communication system comprising:
   a subscriber line to communicatively couple a customer premises DSL modem to a DSL access multiplexer;
   a trouble ticket system; and
   a DSL diagnostic tool to collect performance data associated with the subscriber line and a neighbor subscriber line, to analyze the collected performance data to identify a potential problem with the subscriber line, and to submit a repair ticket in response to the potential problem is not identified, at least one of the trouble ticket system or the DSL diagnostic tool comprising a logic circuit.

23. A DSL communication system as defined in claim 22, further comprising a client browser to obtain a subscriber identifier associated with the subscriber line, wherein the performance data associated with the subscriber line and the neighbor subscriber line is collected based on the subscriber identifier.

24. A DSL communication system as defined in claim 23, wherein the client browser is to present a result of analysis to a user.

25. A DSL communication system as defined in claim 22, further comprising a DSL performance database to store the performance data associated with the subscriber line and the neighbor subscriber line.

\* \* \* \* \*